No. 799,278. PATENTED SEPT. 12, 1905.
B. T. L. THOMSON.
TIRE FOR WHEELS.
APPLICATION FILED MAR. 21, 1905.

Witnesses
J. M. Kuehne
John A. Percival

Inventor
Benjamin T. L. Thomson
by Richardson
ATTORNEY

UNITED STATES PATENT OFFICE.

BENJAMIN THOMAS LINDSAY THOMSON, OF CLAPHAM COMMON, ENGLAND.

TIRE FOR WHEELS.

No. 799,278.          Specification of Letters Patent.          Patented Sept. 12, 1905.

Application filed March 21, 1905. Serial No. 251,197.

*To all whom it may concern:*

Be it known that I, BENJAMIN THOMAS LINDSAY THOMSON, a subject of the King of Great Britain, and a resident of 117 North Side, Clapham Common, in the county of Surrey, England, have invented a new and useful Tire for Wheels, of which the following is a specification.

My invention relates to improvements in tires for wheels of vehicles in which the tread of the tire is formed of separate india-rubber blocks, any of which can be removed and replaced when desired; and the objects of my improvements are, first, to provide means by which the india-rubber blocks can be easily fitted to the tire and removed or replaced; second, to hold the india-rubber blocks firmly and securely in their place round the tire; third, to make a very strong, simple, and effective tire. I attain these objects by the means illustrated in the accompanying drawings, in which—

Figure 1:
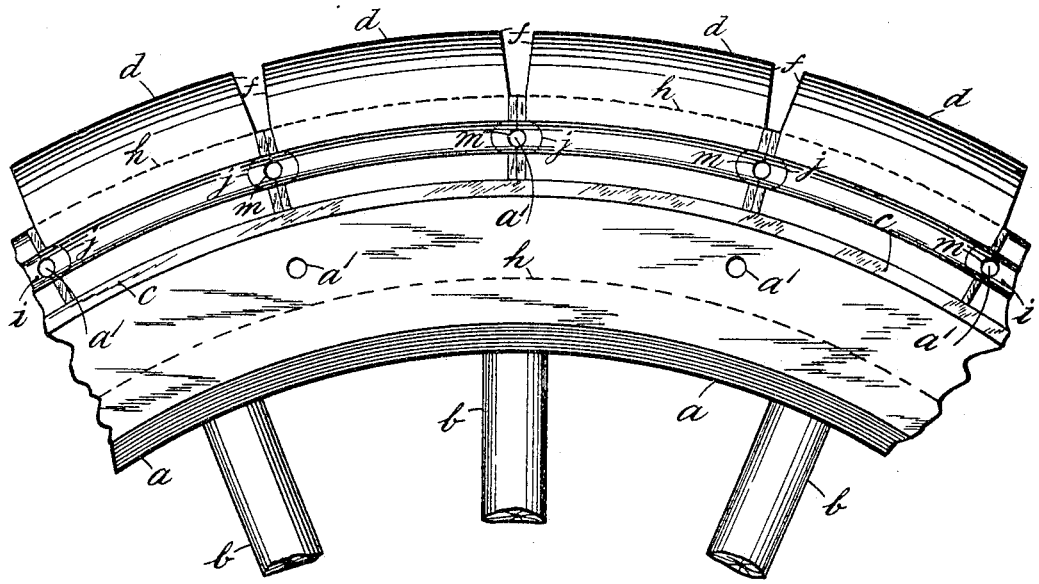
Figure 2:
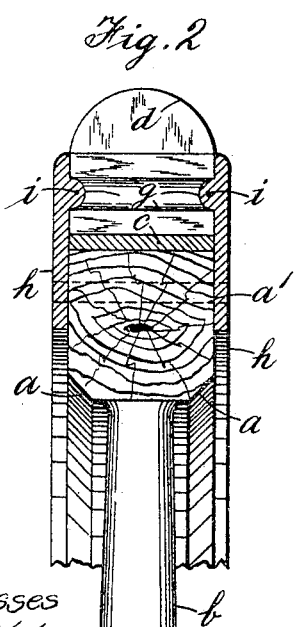
Figure 3:
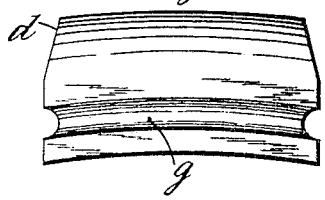
Figure 4:
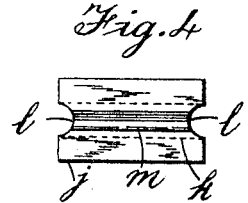
Figure 5:
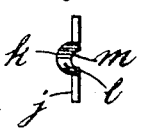

Figure 1 is a side view of part of a tire and of the spokes of the wheel of which it forms part, the remainder being broken off. Fig. 2 is a transverse section through the tire. Fig. 3 is a side view of one of the india-rubber blocks removed from the tire. Fig. 4 is a side view, and Fig. 5 is an end view, of one of the distance-pieces fitted between the ends of the india-rubber blocks.

Similar letters refer to similar parts throughout the several views.

The wooden rim $a$ is fitted in the usual way upon the outer ends of the spokes $b$ of the wheel, their inner ends being fixed in the hub of the wheel.

$c$ is an outer metal tire fitted round the rim $a$, its width being equal to that of the rim, as shown in Fig. 2. The blocks $d$ of india-rubber or other equivalent sufficiently soft and elastic material are arranged round the metal tire $c$, radial spaces being left between their ends at $f$. The sides of these spaces are parallel at their inner part nearest the tire, but may be widened out at their outer part, as shown in Fig. 1. Entirely round each of the india-rubber blocks $d$ a recess or groove $g$, semicircular in section, is made near the inner face or bottom of the blocks, and the outer part or tread of the blocks, which run upon the road, is made more or less convex or curved in transverse section, as shown in Fig. 2, while the entire block in plan (or looking at it from outside) is rectangular in shape, the width of the block being the same as that of the tire, as shown in Fig. 2.

Upon each side of the wheel tire and rim I fit an annular metal ring or plate $h$, which has upon its inside surface near its outer rim a projecting annular rib $i$, extending completely round it and of such shape in section as to fit tightly into the corresponding recesses or grooves $g$ in the sides of the india-rubber blocks $d$, so that when the plates $h$ are drawn, by means of transverse bolts at $a'$, tightly against the outer sides of the wooden rim $a$, the metal tire $c$, and the india-rubber blocks $d$ the blocks are firmly and permanently held in place. As shown in Fig. 1, the ends of the several blocks $d$ are arranged at such a distance apart that they leave between them parallel radial spaces $f$, into which I fit tightly metal transverse distance-pieces $j\ j$. These transverse distance-pieces are shown made in two parts, the flat faces of which fit against each other, while their backs are provided with transverse semicircular ribs $k$, which fit tightly into the corresponding recesses at the ends of the blocks $d$, and the ends of the distance-pieces $j\ j$ are made with semicircular notches or recesses $l$, into which fit the corresponding ribs $i$ upon the annular plates $h$. The upper edge of the distance-pieces $j$ extend outward as far as the outer circumference of the plates $h$, and their inner edges rest upon the metal tire $c$. The distance-pieces may be made in one piece instead of in two parts. The ribs upon the inner side of the plates $h$ and the similar ribs at the back of the distance-pieces $j$ form together a continuous rib semicircular in cross-section, completely filling the corresponding recess round the india-rubber blocks $d$ and holding the latter firmly in place, while by unscrewing the bolts the annular plates can be separated to allow one or more of the india-rubber blocks to be quickly and easily removed or replaced.

I make in the transverse ribs $k$ at the back of the distance-pieces $j$ hollow semicircular recesses $m\ m$, which when the two halves of the distance-pieces are fitted together form cylindrical holes to receive transverse bolts passing through them and through the annular plates $h$, by which the plates $h$, the distance-pieces $j$, and the india-rubber blocks $d$ are held together. Similar transverse bolts are also passed through the annular plates $h$ and the rim $a$ near the inner edge $a'$ of the plates.

The annular plates or rings $h$ may be made in one continuous piece or in two or more parts or segments, either of which can be removed separately.

What I claim as my invention, and desire to secure by Letters Patent, is—

1. The combination in the tire of a wheel for vehicles, of a wooden rim $a$, an outer metal tire $c$, india-rubber blocks $d$ having semicircular recesses $g$, round their sides and ends, annular plates $h$ having corresponding annular ribs round their inner faces, distance-pieces $j$ placed transversely between the ends of the blocks and bolts by which the rim $a$, the annular plates $h$ and the blocks $d$ are held together, substantially as set forth.

2. The combination in the tire of a wheel for vehicles, of a wooden rim $a$, an outer metal tire $c$, india-rubber blocks $d$ having recesses $g$ round their sides and ends, annular plates $h$ having corresponding ribs $i$ round their inner faces, and transverse distance-pieces $j$ having ribs $k$ fitting in the recesses at the ends of the blocks $d$ and notches $l$ at their ends fitting upon the ribs $i$ on the annular plates $h$, and transverse bolts holding together the rim $a$, the plates $h$, and the blocks $d$ substantially as set forth.

3. The distance-pieces $j$, formed in two parts having flat faces fitting against each other, semicircular ribs $k$ at their backs, semicircular notches $l$ at their ends, and semicircular recesses in the flat faces forming holes for transverse bolts, substantially as set forth.

In witness whereof I have hereunto set my hand in the presence of two witnesses.

BENJAMIN THOMAS LINDSAY THOMSON.

Witnesses:
 ARTHUR E. EDWARDS,
 D. K. BOYLE.